United States Patent

Coggins et al.

Patent Number: 5,950,331
Date of Patent: Sep. 14, 1999

[54] VEHICLE DRYING SYSTEM

[76] Inventors: Michael Coggins, 821 Center Ave., Brandon, Fla. 33511-7703; Barry Kearney, 329 Lake Dr., Brandon, Fla. 33510

[21] Appl. No.: 09/005,959

[22] Filed: Jan. 9, 1998

[51] Int. Cl.⁶ .................................................. F26B 19/00
[52] U.S. Cl. ............................................ 34/666; 15/316.1
[58] Field of Search .............................. 34/666, 641, 270; 15/316.1, 312.1, 312.2; 392/363, 364, 370, 371, 379, 382, 383; 239/550

[56] References Cited

U.S. PATENT DOCUMENTS

| | | | |
|---|---|---|---|
| 3,229,703 | 1/1966 | Thomson et al. | 34/666 X |
| 4,036,346 | 7/1977 | Livingston | 15/327.6 |
| 5,033,489 | 7/1991 | Ferre et al. | 134/57 R |
| 5,177,950 | 1/1993 | Fowler, Jr. et al. | 239/602 X |
| 5,535,475 | 7/1996 | Sauter | 34/666 X |
| 5,727,330 | 3/1998 | Cucchi et al. | 34/666 X |

FOREIGN PATENT DOCUMENTS

| | | | |
|---|---|---|---|
| 1 480 225 | 3/1970 | Germany | 34/666 X |

*Primary Examiner*—Henry Bennett
*Assistant Examiner*—Steve Gravini

[57] ABSTRACT

A vehicle drying system, hand held, pressurized air, completely independent vehicle drying system which includes a blower disposed within a housing. The housing has an activation mechanism disposed therein in communication with the blower. The activation mechanism receives coins to activate the blower. The system uses coins, currency, credit/debit cards, tokens, timers. Coins are accumulated within a coin box disposed interiorly of the housing. The activation mechanism is in communication with a timer disposed interiorly of the housing whereby the timer will deactivate the blower after a set period of time. The blower has a hose coupled therewith and extending outwardly of the housing. A plurality of attachments are provided that are adapted for coupling with a free end of the hose. A first attachment portion has a vented nozzle. A second attachment portion has an angled vented nozzle. A third attachment portion has an arcuate vented nozzle.

3 Claims, 6 Drawing Sheets

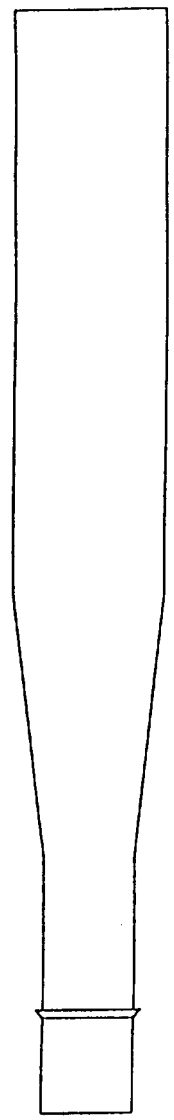

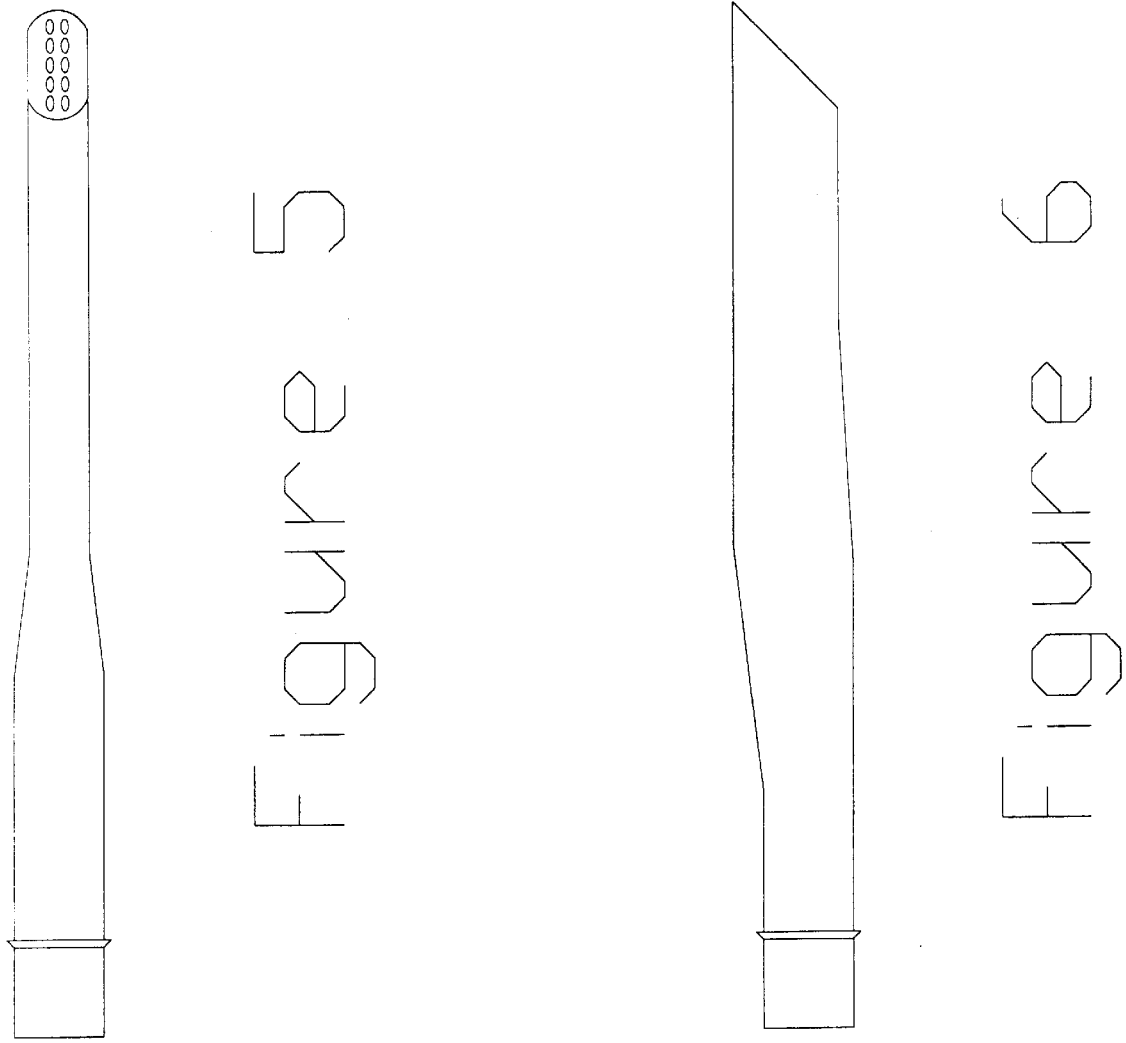

VEHICLE DRYING SYSTEM

BACKGROUND OF THE INVENTION

1. Field of the Invention

The present invention relates to a vehicle drying system and more particularly pertains to a hand held, pressurized air, completely independent vehicle drying system for a vehicle that was washed by a vehicle washing system or other commonly known methods.

2. Description of the Prior Art

The use of car washing systems is known in the prior art. More specifically, car washing systems heretofore devised and utilized for the purpose of washing and cleaning vehicles are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,805,255 to Hed; U.S. Pat. No. 3,939,516 to Hanna; U.S. Pat. No. 3,989,391 to Thomer; U.S. Pat. No. 3,991,433 to Cirino; U.S. Pat. No. 3,994,041 to Barber; U.S. Pat. No. 4,685,169 to Nelson; and U.S. Pat. No. 4,836,467 to Rodgers.

While these devices fulfill their respective, particular objectives and requirement, the aforementioned patents do not describe a vehicle drying system which is a hand held, pressurized air, completely independent vehicle drying system that dries a vehicle that was washed by a vehicle washing system or other commonly known methods.

In this respect, the vehicle drying system according to the present invention substantially departs from the conventional concepts and designs of the prior art, and in doing so provides an apparatus primarily developed for the purpose of drying a vehicle with a hand held, pressurized air, completely independent vehicle drying system.

Therefore, it can be appreciated that there exists a continuing need for new and improved vehicle drying system which can be used for blowing pressurized hot or cold air for drying a vehicle that was washed. In this regard, the present invention substantially fulfills this need.

SUMMARY OF THE INVENTION

In the view of the foregoing disadvantages inherent in the known types of car washing systems now present in the prior art, the present invention provides an improved vehicle drying system. As such, the general purpose of the present invention, which will be described subsequently in more detail, is to provide a new and improved vehicle drying system and method which has all the advantages of the prior art and none of the disadvantages.

To attain this, the present invention essentially comprises a blower disposed within a housing. The housing is securable to a wall surface, free standing, portable, or bolt-on units. The housing has an activation mechanism disposed therein in communication with the blower. The activation mechanism receives coins, currency, credit/debit cards, tokens, or timers to activate the blower. The coins are accumulated within a coin box disposed interiorly of the housing. The activation mechanism is in communication with a timer disposed interiorly of the housing whereby the timer will deactivate the blower after a set period of time. The blower has a hose coupled therewith and extending outwardly of the housing.

A plurality of attachments are provided that are adapted for coupling with a free end of the hose. A first attachment portion has a vented nozzle. A second attachment portion has an angled vented nozzle. A third attachment portion has an arcuate vented nozzle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle drying system which has all the advantages of the prior art car washing systems and none of the disadvantages.

It is another object of the present invention to provide a new and improved vehicle drying system which may be easily and efficiently manufactured and marketed.

It is a further object of the present invention to provide a new and improved vehicle drying system which is of durable and reliable construction.

An even further object of the present invention is to provide a new and improved vehicle drying system which is susceptible of a low cost of manufacture with regard to both materials and labor, and which accordingly is then susceptible of low prices of sale to the consuming public, thereby making such a vehicle drying system economically available to the buying public.

Even still another object of the present invention is to provide a new and improved vehicle drying system for blowing pressurized hot or cold air for drying a vehicle that was washed.

Lastly, it is an object of the present invention to provide a new and improved vehicle drying system including a blower disposed within a housing. The housing has an activation mechanism disposed therein in communication with the blower. The activation mechanism receives coins, currency, credit/debit cards, tokens, or timers to activate the blower. The coins are accumulated within a coin box disposed interiorly of the housing. The activation mechanism is in communication with a timer disposed interiorly of the housing whereby the timer will deactivate the blower after a set period of time. The blower has a hose coupled therewith and extending outwardly of the housing. A plurality of attachments are provided that are adapted for coupling with a free end of the hose. A first attachment portion has a vented nozzle. A second attachment portion has an angled vented nozzle. A third attachment portion has an arcuate vented nozzle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a bottom view of a bottom vented nozzle attachment of the present invention which may be slotted or perforated holes, extending down the length.

FIG. 4 is a side view of the bottom vented nozzle as shown in FIG. 3.

FIG. 5 is a bottom view of an angled end vented nozzle of the present invention.

FIG. 6 is a side view of the angled end vented nozzle as shown in FIG. 5.

DESCRIPTION OF THE PREFERRED EMBODIMENT

Figure 1:
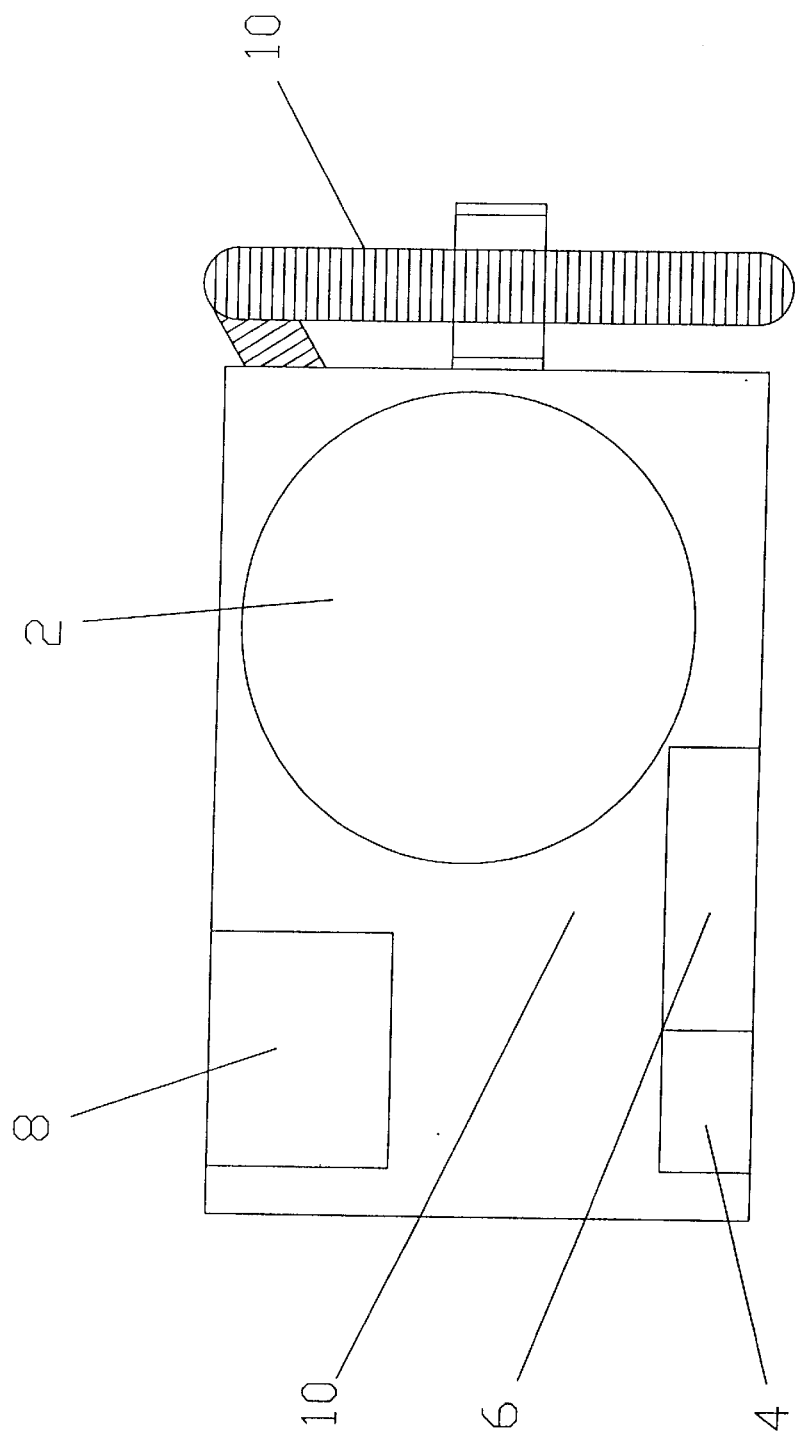
FIG. 1 is a plan view of the preferred embodiment of the vehicle drying system constructed in accordance with the principles of the present invention.
Figure 2:
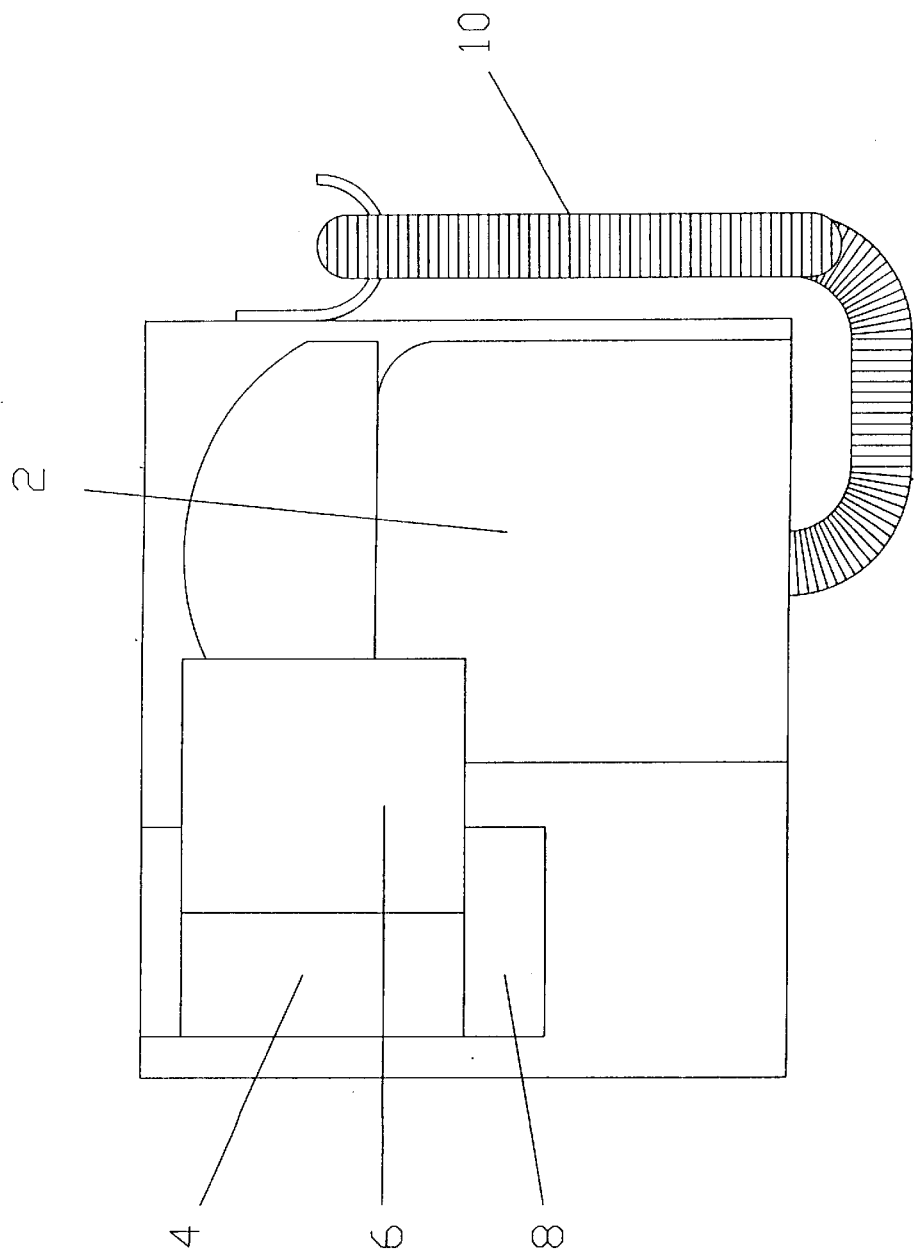
FIG. 2 is a front elevation view of the present invention.
Figure 7:
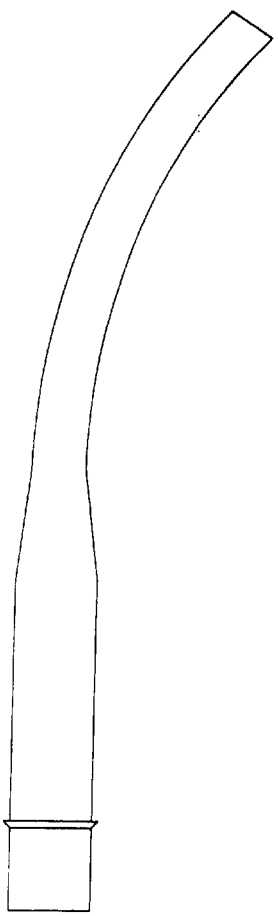
FIG. 7 is a side view of a curved end vented nozzle of the present invention.
Figure 8:
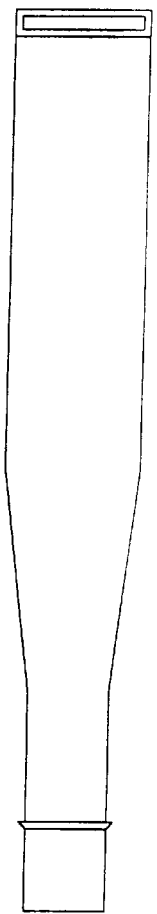
FIG. 8 is a bottom view of the curved end vented nozzle of the present invention.

With reference now to the drawings, and in particular, to FIGS. 1 through 9 thereof, the preferred embodiment of the new and improved vehicle drying system embodying the principles and concepts of the present invention will be described.

Specifically, it will be noted in the various Figures that the device relates to a vehicle drying system for blowing pressurized hot or cold air for drying a vehicle that was washed. In its broadest context, the device consists of a blower and a plurality of attachments. Such components are individually configured and correlated with respect to each other so as to attain the desired objective.

The blower 2 is disposed within a housing. The housing is securable to a wall surface. The housing has an activation mechanism 4 disposed therein in communication with the blower. The activation mechanism 4 receives coins, currency, credit/debit cards, tokens, or timers to activate the blower. Coins are accumulated within a coin box 6 disposed interiorly of the housing. The activation mechanism 4 is in communication with a timer 8 disposed interiorly of the housing whereby the timer 8 will deactivate the blower 2 after a set period of time. The blower 2 has a hose 10 coupled therewith and extending outwardly of the housing.

The plurality of attachment s are adapted for coupling with a free end of the hose 10. A first attachment portion, shown in FIGS. 3 and 4, has a vented nozzle. A second attachment portion, shown in FIGS. 5 and 6, has an angled vented nozzle. A third attachment portion, shown in FIGS. 7 and 8, has an arcuate vented nozzle.

Figure 9:
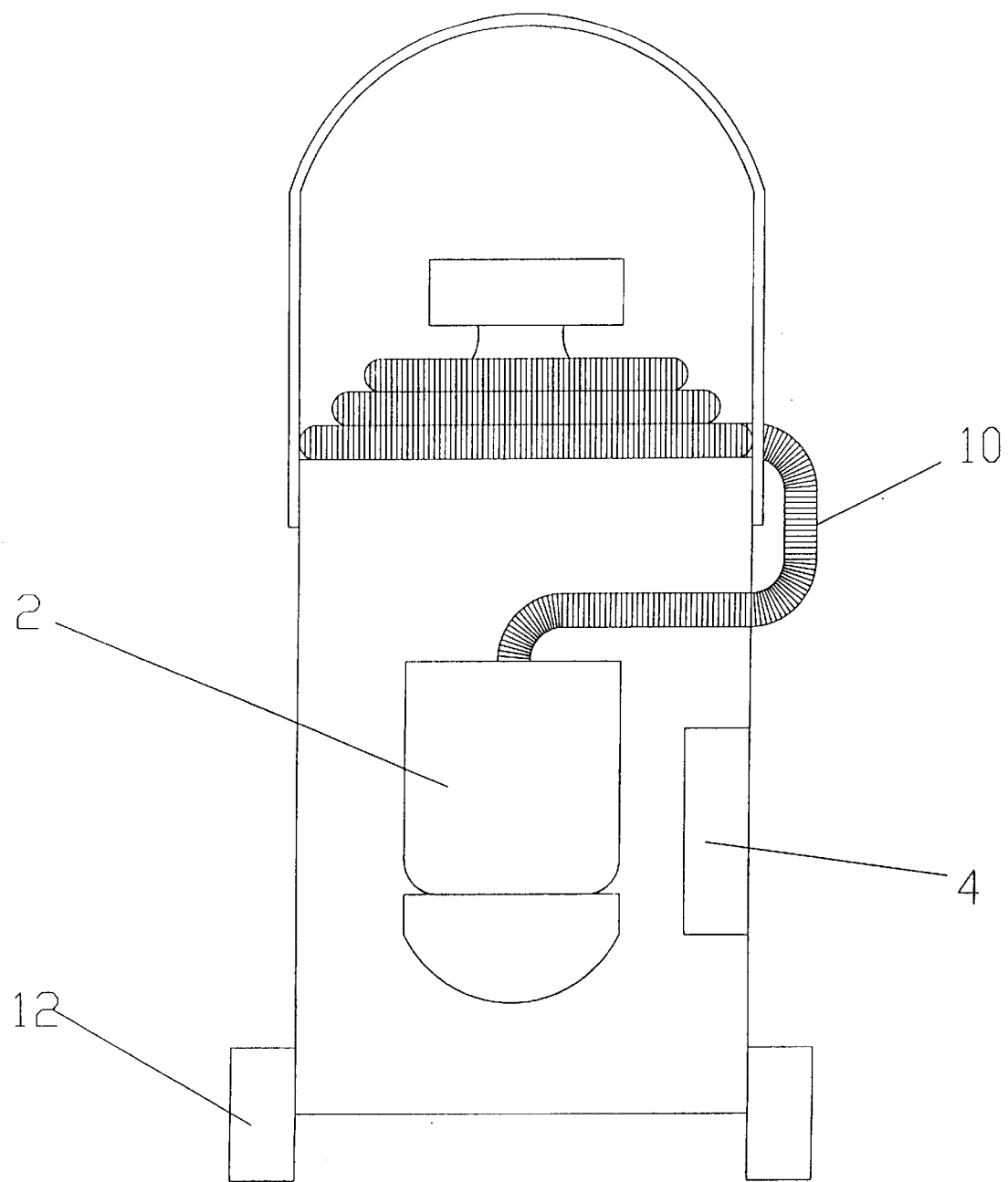
FIG. 9 is a front view of a portable version of the present invention. The same reference numerals refer to the same parts through the various figures.

A second embodiment of the present invention is shown in FIG. 9 and includes substantially all of the components of the present invention further including a larger housing and a pair of wheels 12 disposed on its lower end to aid in the maneuverability of the device.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be restored to, falling within the scope of the invention.

What is claimed as being new and desired to be protected by Letters Patent of the United States is as follows:

1. A vehicle drying system for blowing pressurized hot or cold air for drying a vehicle that was washed comprising, in combination:

a blower disposed within a housing, the housing being securable to a wall surface, the housing having an activation mechanism disposed therein in communication with the blower, the activation mechanism receiving coins, currency, credit/debit cards, tokens, or timers to activate the blower, the coins being accumulated within a coin box disposed interiorly of the housing, the activation mechanism being in communication with a timer disposed interiorly of the housing whereby the timer will deactivate the blower after a set period of time, the blower having a hose coupled therewith and extending outwardly of the housing; and a plurality of attachments adapted for coupling with a free end of the hose, a first attachment portion having a vented nozzle, a second attachment portion having an angled vented nozzle, a third attachment portion having an arcuate vented nozzle.

2. A vehicle drying system for blowing pressurized hot or cold air for drying a vehicle that was washed comprising, in combination:

a blower disposed within a housing, the housing having an activation mechanism disposed therein in communication with the blower, the activation mechanism receiving coins to activate the blower, the coins being accumulated within a coin box disposed interiorly of the housing, the activation mechanism being in communication with a timer disposed interiorly of the housing whereby the timer will deactivate the blower after a set period of time, the blower having a hose coupled therewith and extending outwardly of the housing; and a plurality of attachments adapted for coupling with a free end of the hose, a first attachment portion having a vented nozzle, a second attachment portion having an angled vented nozzle, a third attachment portion having an arcuate vented nozzle.

3. The vehicle drying system as set forth in claim 2 wherein the housing has a pair of wheels disposed on opposite sides thereof.

* * * * *